（12） United States Patent
Ashley et al.

(10) Patent No.: US 8,095,658 B2
(45) Date of Patent: Jan. 10, 2012

(54) METHOD AND SYSTEM FOR EXTERNALIZING SESSION MANAGEMENT USING A REVERSE PROXY SERVER

(75) Inventors: Paul Anthony Ashley, Bardon (AU); Sridhar R. Muppidi, Austin, TX (US); Mark Vandenwauver, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 2047 days.

(21) Appl. No.: 10/840,838

(22) Filed: May 7, 2004

(65) Prior Publication Data

US 2006/0031442 A1    Feb. 9, 2006

(51) Int. Cl.
*G06F 15/16* (2006.01)
(52) U.S. Cl. ......... 709/226; 709/227; 709/229; 709/204
(58) Field of Classification Search .................. 709/226, 709/223; 370/236; 380/225; 705/26
See application file for complete search history.

(56) References Cited

U.S. PATENT DOCUMENTS

| | | | | |
|---|---|---|---|---|
| 6,490,620 B1* | 12/2002 | Ditmer et al. | ................. | 709/224 |
| 6,549,516 B1* | 4/2003 | Albert et al. | ................. | 370/236 |
| 6,970,933 B1* | 11/2005 | Masters | ........................ | 709/229 |
| 7,058,600 B1* | 6/2006 | Combar et al. | ................. | 705/34 |
| 7,139,811 B2* | 11/2006 | Lev Ran et al. | ............... | 709/217 |
| 7,162,649 B1* | 1/2007 | Ide et al. | ........................ | 713/165 |
| 7,185,364 B2* | 2/2007 | Knouse et al. | .................... | 726/8 |
| 7,216,163 B2* | 5/2007 | Sinn | ............................. | 709/224 |
| 7,243,366 B2* | 7/2007 | Medvinsky et al. | ............. | 726/2 |
| 7,359,933 B1* | 4/2008 | Polen et al. | .................... | 709/203 |
| 2002/0143856 A1* | 10/2002 | Sastri et al. | ................... | 709/202 |
| 2002/0178214 A1* | 11/2002 | Brittenham et al. | .......... | 709/203 |
| 2002/0198883 A1* | 12/2002 | Nishizawa et al. | ............. | 707/10 |
| 2003/0204645 A1* | 10/2003 | Sharma et al. | ................ | 709/328 |
| 2004/0064564 A1* | 4/2004 | Belkin | .......................... | 709/227 |
| 2005/0261985 A1* | 11/2005 | Miller et al. | .................... | 705/26 |
| 2006/0288212 A1* | 12/2006 | Chiang | ........................ | 713/170 |
| 2008/0056494 A1* | 3/2008 | Jacobson et al. | ............. | 380/255 |

* cited by examiner

*Primary Examiner* — Kenny Lin
*Assistant Examiner* — Sulaiman Nooristany
(74) *Attorney, Agent, or Firm* — Jeffrey S. LaBaw; David H. Judson

(57) ABSTRACT

A method, system, and computer program product is presented for providing access to a set of resources in a distributed data processing system. A reverse proxy server receives a resource request from a client and determines whether or not it is managing a session identifier that was previously associated with the client by the reverse proxy server; if so, it retrieves the session identifier, otherwise it obtains a session identifier and associates the session identifier with the client using information that is managed by the reverse proxy server. The reverse proxy server then modifies the resource request to include the session identifier and forwards the modified resource request to an application server.

15 Claims, 6 Drawing Sheets

METHOD AND SYSTEM FOR EXTERNALIZING SESSION MANAGEMENT USING A REVERSE PROXY SERVER

BACKGROUND OF THE INVENTION

1. Field of the Invention

The present invention relates to an improved data processing system and, in particular, to a method and apparatus for multicomputer data transferring. Still more particularly, the present invention provides a method and apparatus for multicomputer distributed resource management.

2. Description of Related Art

A variety of online information and services are available through the Internet and other networks, and experienced users expect certain functionality to be present with particular online applications. Online applications are typically accessed through web browsers or similar applications that use HyperText Transport Protocol (HTTP) to transfer information between themselves and the online applications.

Various operational issues arise with online applications because HTTP is a stateless protocol in which each server access is considered to be an independent connection. Each subsequent user action within a web page typically results in another request from the client to the server. Any significant user interaction with an online application results in many accesses, i.e. connections, to the server.

Hence, developers of online applications face the issue of determining a method for maintenance of user sessions at the server in order to provide the functionality that is expected by experienced users. The maintenance of session information allows sequential accesses or requests from a single user to be identified as such by a server. Otherwise, a user would be required to repeat certain actions for each subsequent access or request to the online application.

For example, when accessing an e-commerce web site, an experienced user expects a high-quality web site to provide a shopping cart function. A shopping cart application, though, requires the maintenance of a continuous user session at the server so that the server can recognize subsequent or sequential accesses from the user and then return the appropriate information after each access, thereby allowing the user to see previously selected products within the shopping cart. Otherwise, the shopping cart application might re-authenticate the user upon each request to perform an action related to the shopping cart, which would be an intolerable experience for the user.

Various computational mechanisms have been developed to address the inherent limitations of HTTP yet maintain session states for online applications that are accessible through web browsers or similar applications. However, most e-commerce web sites comprise multiple applications, each of which requires the maintenance of session state information.

Therefore, it would be advantageous to have a method and a system that allows multiple related online applications to maintain session states as necessary for themselves while session management across the multiple related online applications is performed in a common manner.

SUMMARY OF THE INVENTION

A method, system, and computer program product is presented for providing access to a set of resources in a distributed data processing system. A reverse proxy server receives a resource request from a client and determines whether or not it is managing a session identifier that was previously associated with the client by the reverse proxy server; if so, it retrieves the session identifier, otherwise it obtains a session identifier and associates the session identifier with the client using information that is managed by the reverse proxy server. The reverse proxy server then modifies the resource request to include the session identifier and forwards the modified resource request to an application server.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
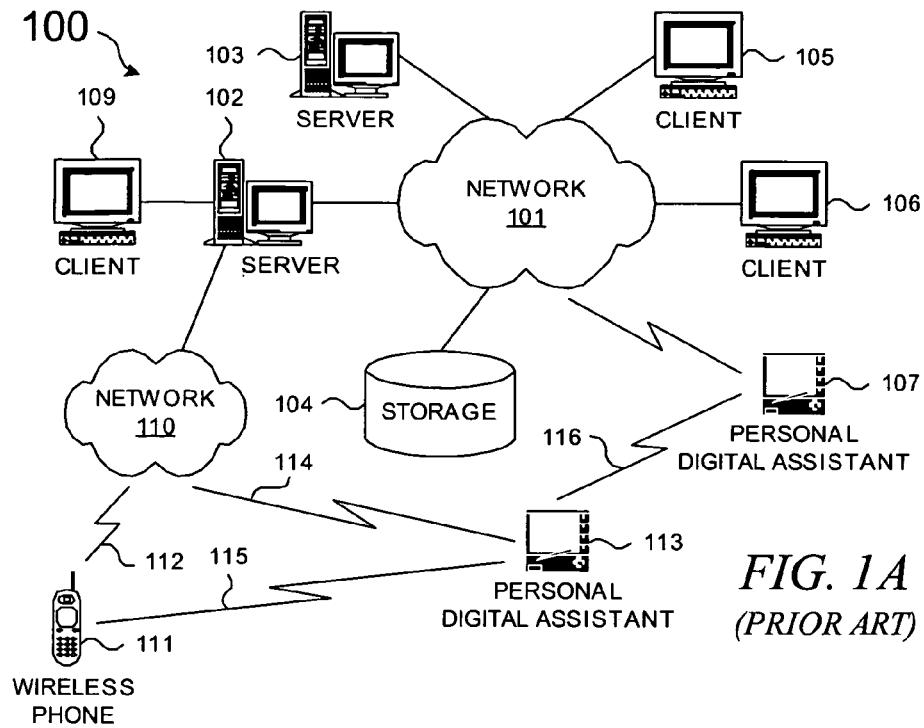
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-

103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
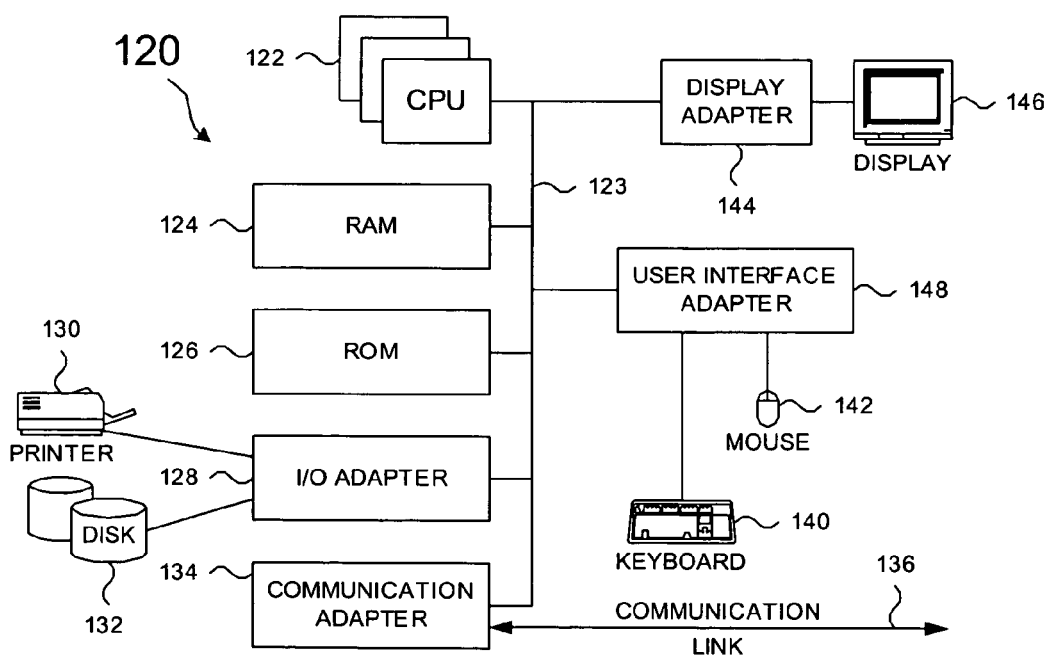
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved data processing environment. Prior to describing the present invention in more detail, a typical distributed data processing environment is described.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Figure 1C:
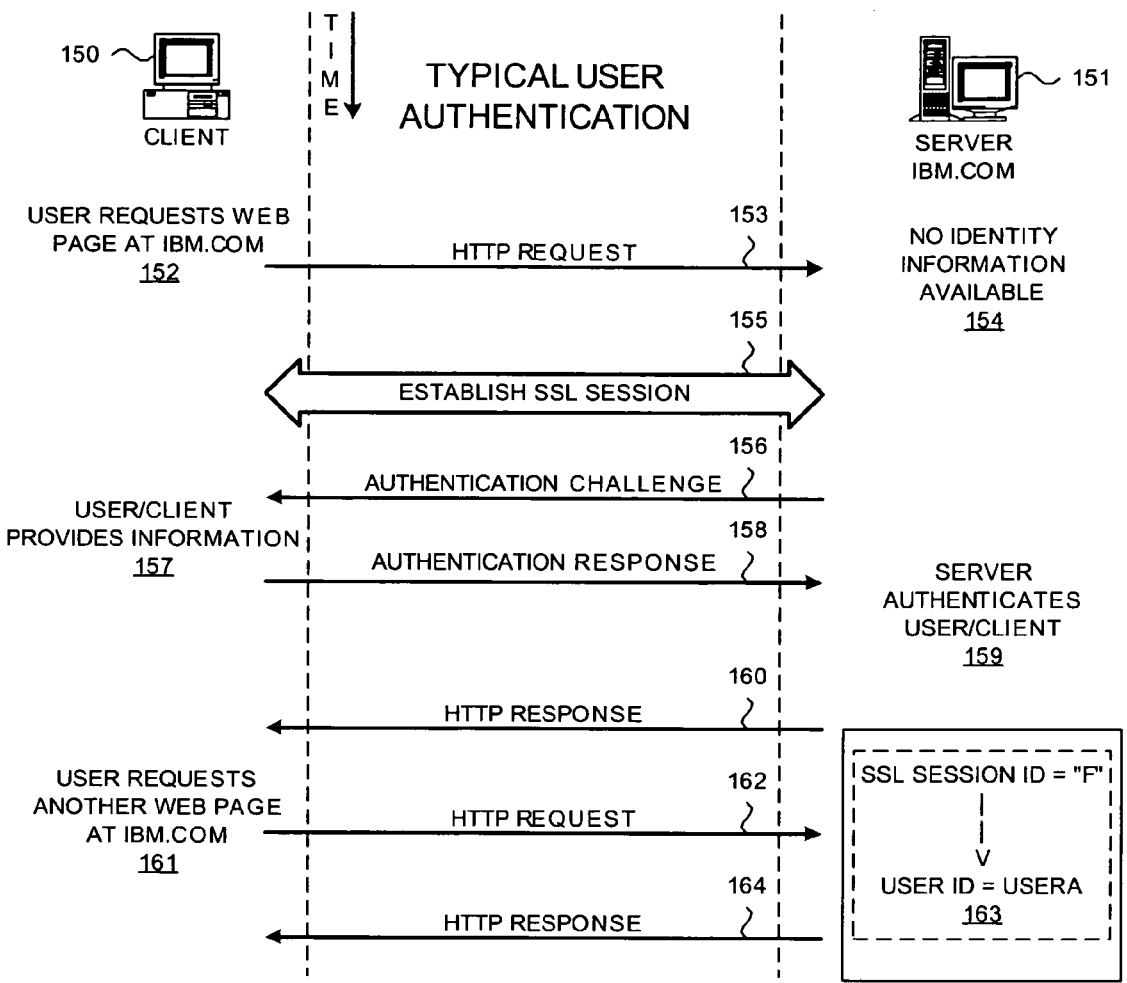
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected or controlled resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client. The server creates a session identifier for the client, and any subsequent request messages from the client within the session would be accompanied by the session identifier.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163) because the user's session identifier is returned to the server in the HTTP request message, and the server sends the requested web page back to the client in another HTTP response message (step 164).

Figure 1D:
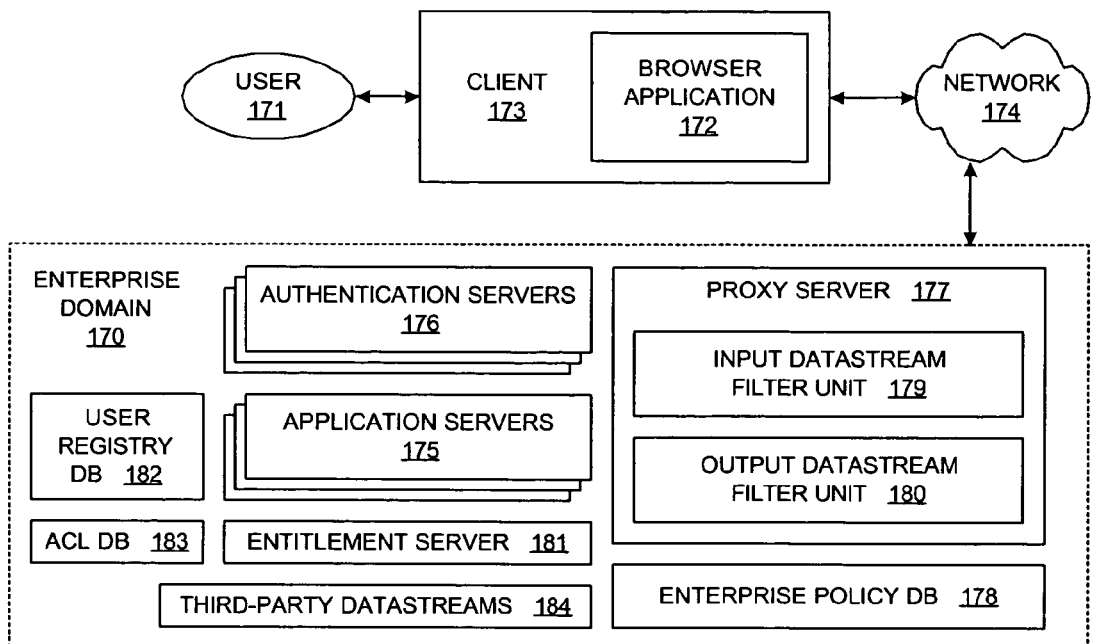
FIG. 1D depicts a block diagram that shows a typical distributed data processing system for an enterprise domain.

With reference now to FIG. 1D, a block diagram depicts a typical distributed data processing system for an enterprise domain. As in a typical corporate computing environment or an Internet-based computing environment, enterprise domain 170 hosts controlled resources that user 171 can access, e.g., by using browser application 172 on client device 173 through network 174. Application servers 175 support accessible resources through web-based applications or other types of applications, including legacy applications. Authentication servers 176 support various authentication mechanisms, such as username/password, X.509 certificates, secure tokens, or an SSL session like that shown in FIG. 1C.

Enterprise domain 170 supports multiple servers. Proxy server 177 performs a wide range of functions for enterprise domain 170. Proxy server 177 can be administratively configured through configuration files and enterprise policy database 178 to control the functionality of proxy server 177, e.g., caching web pages in order to mirror the content from an application server or filtering the incoming and outgoing datastreams through input datastream filter unit 179 and output datastream filter unit 180. Input datastream filter unit 179 may perform multiple checks on incoming requests while output datastream filter unit 180 may perform multiple checks on outgoing responses; each check may be performed in accordance with goals and conditions that are specified within various enterprise policies.

Enterprise domain 170 comprises entitlements server 181, which accepts information within user registry database 182, access control list (ACL) database 183, and third-party datastreams 184 from other domains. Entitlements server 181 determines whether users are authorized to access certain services that are provided by application servers 175 within domain 170 by checking policies and/or access control lists against user requests for those services. A set of user-specific entitlements is used by proxy server 177, entitlement server 181, or a combined or coordinated effort between proxy server 177 and entitlement 181 to determine or control access to application servers 175 and other controlled resources in response to user requests.

The above-noted entities within enterprise domain 170 represent typical entities within many computing environments. As was shown with respect to FIG. 1C, web-based applications can utilize various means to prompt users to enter authentication information, often as a username/password combination within an HTML form. In the example that is shown in FIG. 1D, user 171 may be required to be authenticated before client 173 may have access to resources, after which a session is established for client 173 in a manner similar to that described above in FIG. 1C. In FIG. 1D, after receiving an incoming request from client 173, input datastream filter unit 179 may determine whether client 173 has already established a session; if not, an authentication service on authentication servers 176 can be invoked in order to authenticate user 171. If client 173 has already established a session, then additional checks may be performed on an incoming request prior to granting access to a controlled resource; the additional checks may be specified in an enterprise authentication policy.

The application data traffic in FIG. 1C is described with respect to HTTP, which is the most common protocol for transferring data within the World Wide Web, e.g., data traffic between web browsers and web servers. However, as noted above, a variety of operational issues arise with online applications because HTTP is a stateless protocol in which each server access is considered to be an independent connection. Each subsequent user action within a web page typically results in another request from the client to the server. Any significant user interaction with an online application results in many accesses, i.e. connections, to the server.

Hence, developers of online applications face the issue of determining a method for maintenance of user sessions at the server in order to provide the functionality that is expected by experienced users. The maintenance of session information allows sequential accesses or requests from a single user to be identified as such by a server. Otherwise, a user would be required to repeat certain actions for each subsequent access or request to the online application.

Various computational mechanisms have been developed to address the inherent limitations of HTTP yet maintain session states for online applications that are accessible through web browsers or similar applications. However, most e-commerce web sites comprise multiple applications, each of which requires the maintenance of session state information, as described below with respect to FIG. 1E.

Figure 1E:
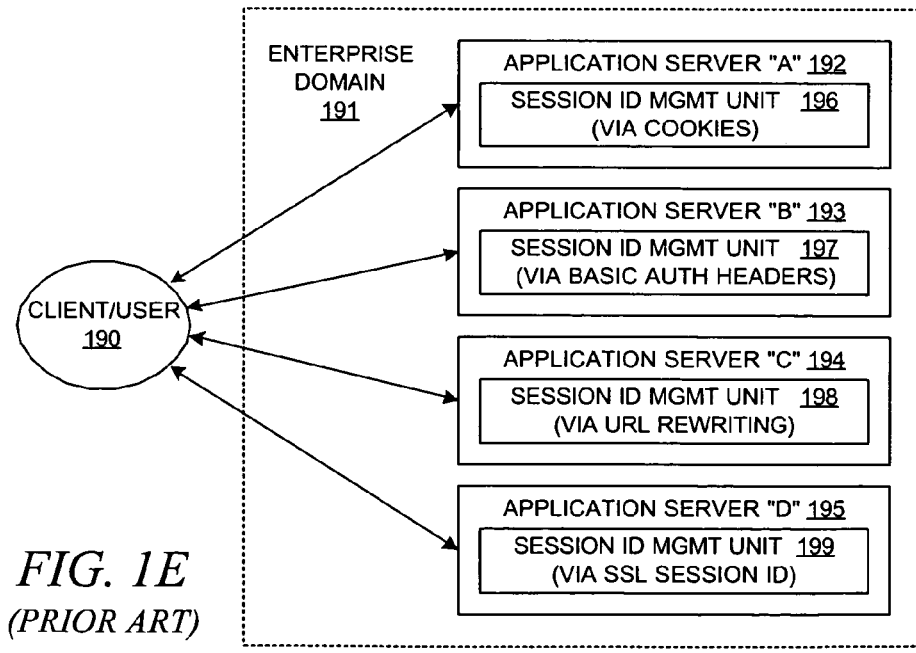
FIG. 1E depicts a block diagram that shows a typical distributed data processing system for an enterprise domain while focusing on the session identifier management of the application servers within the enterprise domain.

With reference now to FIG. 1E, a block diagram depicts a typical distributed data processing system for an enterprise domain while focusing on the session identifier management of the application servers within the enterprise domain. In a manner similar to that shown in FIG. 1D, user/client 190 sends requests to access resources within enterprise domain 191, which hosts application servers 192-195.

As user 190 accesses resources that are provided by servers 192-195, each server independently performs session management. Each of application servers 192-195 contains an independent session identifier management unit, which are shown as session ID management units 196-199 for servers 192-195, respectively.

Moreover, each of session ID management units 196-199 performs its session ID management operations in a different manner. As mentioned above, various computational mechanisms have been developed to address the inherent limitations of HTTP, which is reflected within FIG. 1E; four common yet different computational mechanisms for session ID management are mentioned within FIG. 1E, including cookies, basic authentication headers, URL rewriting, and SSL session ID. However, each of these computational mechanisms can be problematic.

Application server 192 has a session ID management unit 196 that issues cookies for its session ID management scheme. Cookies are used to store information at the user's browser; they are subsequently returned to the issuing domain, which allows e-commerce sites to track user movements and collect other information. Increasingly, the use of cookies is being protested by users who regard cookies as a privacy violator. Some governmental bodies are considering legislation to ban the use of cookies because of these privacy issues.

Application server 193 has a session ID management unit 197 that uses basic authentication headers for its session ID management scheme. In each request, the user's authentication information, typically a username and a password, is sent from the user's browser to the application server, which extracts this information from each request to identify the user. This scheme has several, possibly severe, security consequences because of the significant possibility of password exposure.

Application server 194 has a session ID management unit 198 that uses URL rewriting for its session ID management scheme. This scheme requires that all URL's within the outgoing web pages from the application server to have an associated session ID, e.g., either embedded in each URL or appended to each URL. Hence, URL rewriting requires either pervasive logic throughout the software code of an application server when an outgoing datastream is being generated or extensive modification to an outgoing datastream to embed the session ID's afterward.

Application server 195 has a session ID management unit 199 that uses SSL session ID's for its session ID management scheme, e.g., as shown in FIG. 1C. This scheme has the convenience of re-using the SSL session identifier for various non-security application purposes. However, the SSL session identifiers cannot be shared between applications within the enterprise domain. Hence, each application needs to create a new SSL session with the user/client.

Turning now to focus on the present invention, the present invention is directed to an improved, computational, session ID management mechanism in which session ID management is externalized and centralized with respect to associated application servers within a single domain by placing the session ID management within a reverse proxy server within the domain. The present invention is described in more detail below with respect to the remaining figures.

Figure 2:
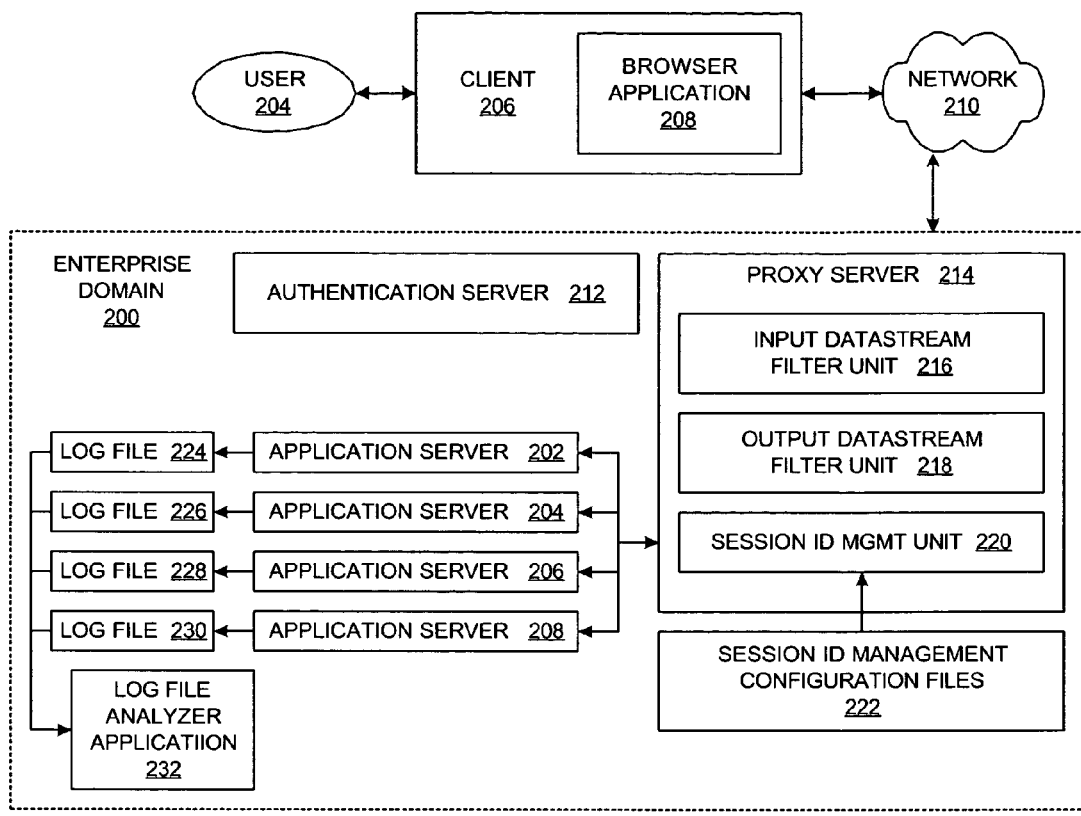
FIG. 2 depicts a distributed data processing system in an enterprise domain that hosts application servers along with a reverse proxy server that has been extended to include session identifier management functionality in accordance with the present invention.

With reference now to FIG. 2, a block diagram depicts a distributed data processing system in an enterprise domain that hosts application servers along with a reverse proxy server that has been extended to include session identifier management functionality in accordance with the present invention. FIG. 2 represents a distributed data processing system with similar functionality to that shown in FIG. 1C, although some of the entities that are shown in FIG. 2 differ from the entities that are shown in FIG. 1C. Enterprise domain 200 hosts controlled resources that are provided by application servers 202-208 and that are available for access by user 204, e.g., by using browser application 206 on client device 208 through network 210. Application servers 202-208 support accessible resources through web-based applications or other types of applications, including legacy applications. Authentication servers 212 support various authentication mechanisms, such as username/password, X.509 certificates, secure tokens, or an SSL session.

Proxy server 214 performs a wide range of functions for enterprise domain 200. Proxy server 214 can be administratively configured through configuration files, e.g., caching web pages in order to mirror the content from an application server or filtering the incoming and outgoing datastreams through input datastream filter unit 216 and output datastream filter unit 218. Input datastream filter unit 216 may perform multiple checks on incoming requests while output datastream filter unit 218 may perform multiple checks on outgoing responses.

Proxy server 214 is used as a reverse proxy server. A reverse proxy server is a term for a proxy server that is being used by a service provider to process transactions prior to the receipt of those transactions at typically more than one application server. In this manner, resource requests are routed through the proxy server, thereby directly presenting the proxy server to requesting clients rather than the application servers; in other words, the proxy server acts as a proxying agent for one or more servers. Reverse proxy servers may operate inside or outside a firewall with respect to an enterprise domain.

Other entities may be contained but not shown within the distributed data processing system of FIG. 2. More importantly, though, proxy server 214 is implemented as an example of an embodiment of the present invention such that it provides a solution for solving various issues with respect to session identifier management. Proxy server 214 has been extended to include session ID management unit 220, which provides session ID management functionality in a centralized location that is externalized with respect to application servers 202-208. In one embodiment of the present invention, session ID management unit 220 may be configured through session ID management configuration files 222 such that it performs session ID operations in a specific manner that is tailored for each application server. Application servers 202-208 rely on session ID management unit 220 for providing session ID's such that application servers 202-208 can maintain persistent user sessions as necessary for completing their application tasks. In one embodiment of the present invention, each of the application servers maintains an event log file or database, shown as log files 224-230, that contains historical information about the operations of its associated application server. Log file analyzer application 232 uses the information in log files 224-230 for administrative reports, as explained in more detail further below.

Figure 3:
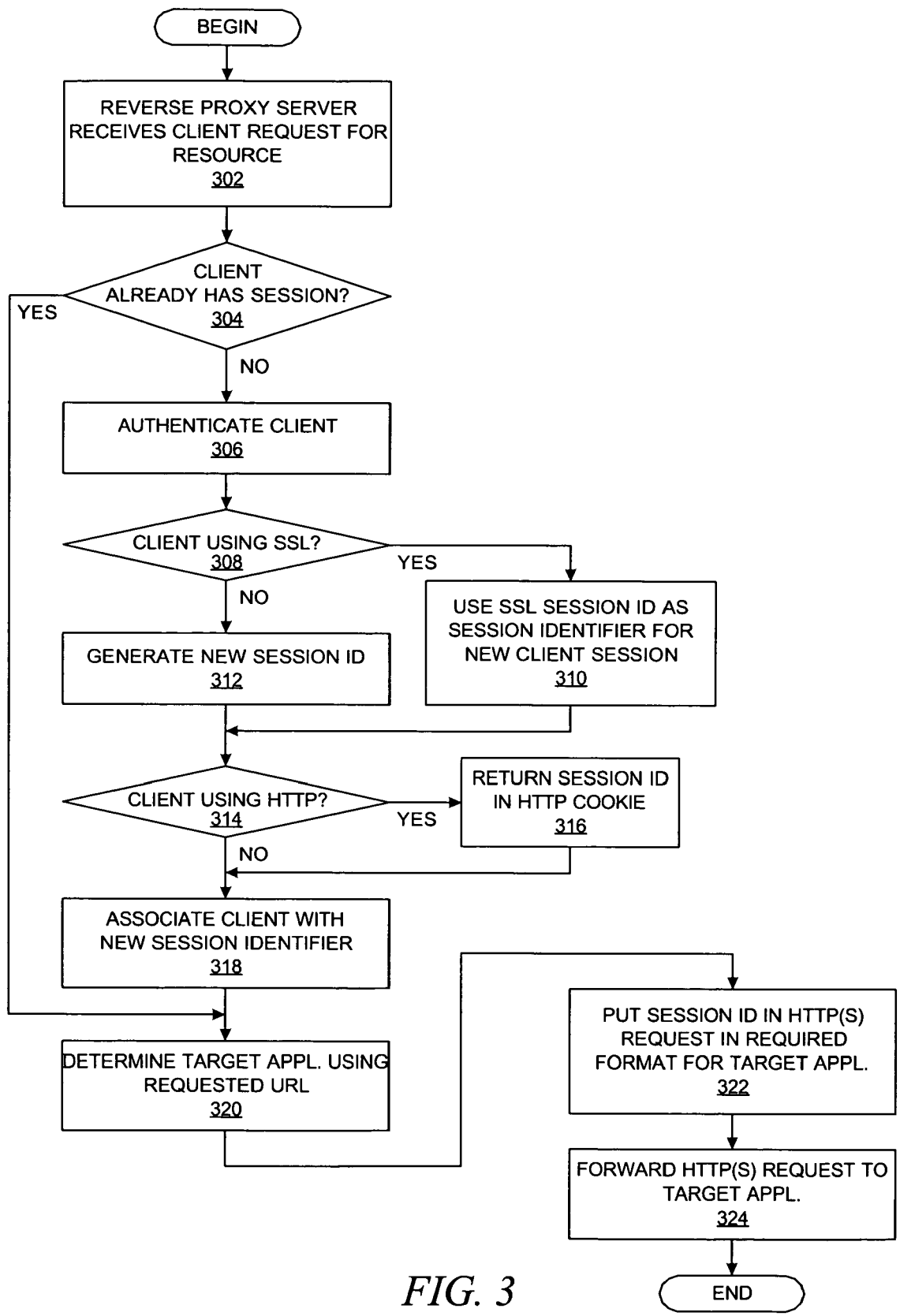
FIG. 3 depicts a flowchart that shows a process by which a reverse proxy server provides centralized session identifier management for application servers through incoming datastreams in accordance with an embodiment of the present invention.

With reference now to FIG. 3, a flowchart depicts a process by which a reverse proxy server provides centralized session identifier management for application servers through incoming datastreams in accordance with an embodiment of the present invention. The process commences when a reverse proxy server receives a client request for a resource (step 302), after which the reverse proxy makes a determination of whether or not the requesting client already has an active session with respect to the reverse proxy server (step 304). If the requesting client does not already have an active session, then the reverse proxy server authenticates the client (step 306). In a preferred embodiment, the reverse proxy server relies on an authentication server to perform the authentication operation with respect to the client; in such cases, the reverse proxy server may assign a session identifier to the client before the authentication operation has been completed.

Assuming that the client successfully completes the authentication operation, the reverse proxy server then determines if the client has used SSL to connect to the domain of the reverse proxy server (step 308). If so, then the reverse proxy server is able to use the SSL ID as the session identifier for the new client session (step 310) with respect to resource access within the domain. If SSL has not been used, then the reverse proxy server generates a new session identifier (step 312).

In either case, the reverse proxy server may check whether the client has used HTTP to send the original incoming resource access request (step 314); if so, then the reverse proxy server optionally returns the session ID to the client in the form of an HTTP cookie (step 316). The cookie may be returned to the client immediately, or the reverse proxy may set a flag in association with the client's session information such that a cookie is returned to the client with the next outgoing response to the client. Whether or not the client is using HTTP, the reverse proxy server associates the client with the new session identifier (step 318), e.g., by creating the appropriate data structures to store the session identifier along with any other required information in a form that is accessible by the reverse proxy server.

The subsequent steps are then performed whether the incoming client request is from a client that already has a session with the reverse proxy server, which was determined at step 304, or whether the incoming client request is the first request from the client, which required the creation of a new session as shown in steps 306-318. The reverse proxy server then determines the application server that is the target of the incoming client request message (step 320) by examining the requested URL, or more generally, the requested URI. After determining the target application, the reverse proxy server puts the session identifier into the HTTP request or HTTPS request message in a format that is required or expected by the target application (step 322), e.g., using HTTP headers, a cookie, or some other manner. The modified request message is then forwarded to the target application by the reverse proxy server (step 324), thereby concluding the process.

In one embodiment, the session identifier may be placed into the forwarded message in only one format for all application servers. In a preferred embodiment, the reverse proxy server is configurable through environment variables, databases, configuration files, e.g., as shown in FIG. 2, or in some other manner, and the reverse proxy server uses the configuration information to tailor the manner in which the forwarded message is modified to include the session identifier for use by the receiving application server. In this manner, the reverse proxy server is able to manage the session identifiers on behalf of the application servers while providing the session identifiers to the application servers in a manner that is expected by the application servers, thereby reducing or eliminating the modifications that need to be done to an application server in order to interoperate with the reverse proxy server of the present invention.

Figure 4:
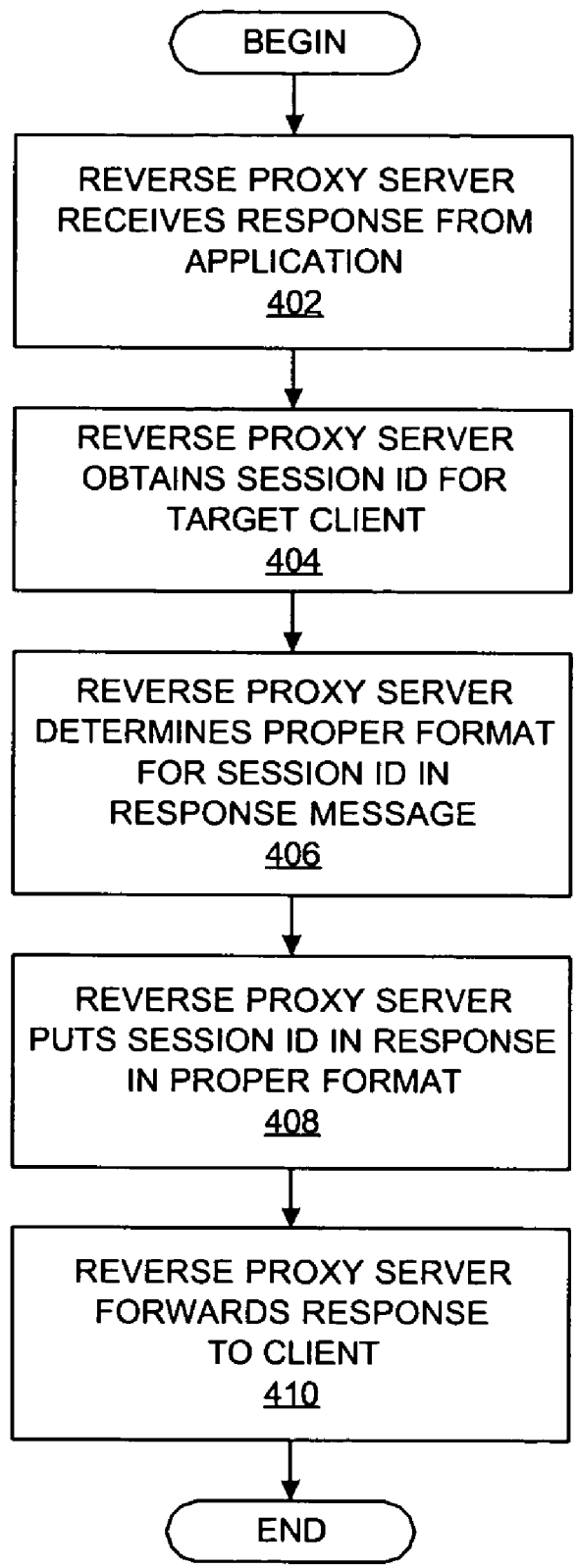
FIG. 4 depicts a flowchart that shows a process by which a reverse proxy server modifies outgoing datastreams in order to perform centralized session identifier management tasks for application servers in accordance with an embodiment of the present invention.

With reference now to FIG. 4, a flowchart depicts a process by which a reverse proxy server modifies outgoing datastreams in order to perform centralized session identifier management tasks for application servers in accordance with an embodiment of the present invention. The process commences when the reverse proxy server receives an outgoing response from an application server (step 402). The reverse proxy server obtains the session identifier for the target client to which the application server is directing the outgoing response (step 404), The reverse proxy determines the proper format for the session identifier within the response message (step 406) and modifies the response message to include the session identifier (step 408), e.g., by including a cookie, rewriting a URI, or in some other manner. The reverse proxy server then forwards the response to the client (step 410), thereby concluding the process.

In one embodiment, the session identifier may be placed into the forwarded message in only one format for all clients. In a preferred embodiment, the reverse proxy server is configurable through environment variables, databases, configuration files, e.g., as shown in FIG. 2, or in some other manner, and the reverse proxy server uses the configuration information to tailor the manner in which the forwarded message is modified to include the session identifier to be received by the client. In this manner, the reverse proxy server is able to manage the session identifiers on behalf of the application servers while providing the session identifiers to the clients, thereby reducing or eliminating any efforts by the application servers to return session identifiers to clients.

Because all of the outgoing traffic would pass through a reverse proxy server, the reverse proxy server could determine, or possibly be notified by an application, that the user has completed some form of logout process; the reverse proxy server could then delete the user session.

The advantages of the present invention should be apparent in view of the detailed description that is provided above. A reverse proxy server that operates in accordance with the present invention allows an enterprise domain, such as an e-commerce site, to maintain continuous or persistent user sessions across multiple HTTP connections while eliminating the need for the application servers to manage session states.

One advantage of centralizing the session ID management within the reverse proxy server is that the same session identifier would be used by all application servers with respect to a particular user/client session. Many prior art application servers incorporate some form of functionality for logging their actions within a log file or database with respect to the operations that they perform on client-requested transactions, and this logged information generally includes the session identifiers for the sessions that caused the application servers to perform the identified operations or events. With the present invention, all application servers would log the same session identifier when processing transactions that are related to the same user session. By analyzing the log information, a system administrator or some other type of employee of the operator of the domain can examine the actions of a user over time through multiple applications because the logs would have the electronic tracks or the electronic path of the user based on the user's session identifier. For example, a marketing employee could examine the movement of a user throughout a web site, thereafter determining the effectiveness of attracting a user to particular web pages or determining the efficiency with which a user completes various transactions. Moreover, the electronic paths of multiple users could be compared, possibly cross-referenced with demographic information about the users to determine the usage patterns of users throughout a web site.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing requests to access a set of resources in a distributed data processing system, the method comprising:
   receiving a resource request from a client at a proxy server, the proxy server providing a centralized session identifier management service for a set of application servers within a domain so that the set of application servers need not manage session state information;
   in response to a determination by the proxy server that the proxy server is managing a session identifier that was previously associated with the client by the proxy server, retrieving the session identifier;
   in response to a determination by the proxy server that the proxy server is not managing a session identifier that was previously associated with the client by the proxy server, obtaining a new session identifier and associating the new session identifier with the client using information that is managed by the proxy server;
   determining the application server that is a target of the resource request;
   modifying the resource request by the proxy server to include the session identifier or the new session identifier, wherein the resource request is modified according to a configuration uniquely associated with the application server that is the target of the resource request, wherein the step of modifying includes:
      retrieving configuration information associated with the application server of the set of application servers, wherein the configuration information associated with the application server indicates a type of modification to be made to resource requests with respect to a session identifier; and
      formatting the modified resource request in accordance with the configuration information associated with the application server; and
   forwarding the modified resource request by the proxy server to the application server that is the target of the resource request.

2. The method of claim 1 further comprising:
   in response to a determination by the proxy server that the proxy server is not managing a session identifier that was previously associated with the client by the proxy server, obtaining the new session identifier by using an SSL (Secure Sockets Layer) identifier as the new session identifier.

3. The method of claim 1 further comprising:
   in response to a determination by the proxy server that the proxy server is not managing a session identifier that was previously associated with the client by the proxy server, returning the new session identifier to the client as an HTTP (HyperText Transport Protocol) cookie if the client request was an HTTP request.

4. The method of claim 1 further comprising:
   generating at the proxy server a session identifier for each session between an application server and a client.

5. The method of claim 1 further comprising: managing at the proxy server a session identifier for each session between an application server and a client.

6. A computer program product on a non-transitory computer readable medium for processing requests to access a set of resources in a distributed data processing system, the computer program product holding computer program instructions which when executed by a processor perform a method comprising:
   receiving a resource request from a client at a proxy server, the proxy server providing a centralized session identifier management service for a set of application servers within a domain so that the set of application servers need not manage session state information;
   retrieving the session identifier in response to a determination by the proxy server that the proxy server is managing a session identifier that was previously associated with the client by the proxy server;
   obtaining a new session identifier and associating the session identifier with the client using information that is managed by the proxy server in response to a determination by the proxy server that the proxy server is not managing a session identifier that was previously associated with the client by the proxy server;
   determining the application server that is a target of the resource request;
   modifying the resource request by the proxy server to include the session identifier or the new session identifier, wherein the resource request is modified according to a configuration uniquely associated with the application server that is the target of the resource request, wherein the step of modifying includes:
      retrieving configuration information associated with the application server of the set of application servers, wherein the configuration information associated with the application server indicates a type of modification to be made to resource requests with respect to a session identifier; and
      formatting the modified resource request in accordance with the configuration information associated with the application server; and forwarding the modified resource request by the proxy server to the application server that is the target of the resource request.

7. The computer program product of claim 6 wherein the method further comprises:
   obtaining, in response to a determination by the proxy server that the proxy server is not managing a session identifier that was previously associated with the client by the proxy server, the new session identifier by using an SSL (Secure Sockets Layer) identifier as the new session identifier if the client has connected to the proxy server using SSL.

8. The computer program product of claim 6 wherein the method further comprises:
   returning, in response to a determination by the proxy server that the proxy server is not managing a session identifier that was previously associated with the client by the proxy server, the new session identifier to the client as an HTTP (HyperText Transport Protocol) cookie if the resource request was an HTTP request.

9. The computer program product of claim 6 wherein the method further comprises:
   generating at the proxy server a session identifier for each session between an application server and a client.

10. The computer program product of claim 6 wherein the method further comprises:

managing at the proxy server a session identifier for each session between an application server and a client.

11. An apparatus for processing requests to access a set of resources in a distributed data processing system, the apparatus comprising:

a processor;

a computer memory holding computer program instructions which when executed by the processor perform a method comprising:

receiving a resource request from a client at a proxy server, the proxy server providing a centralized session identifier management service for a set of application servers within a domain so that the set of application servers need not manage session state information;

retrieving the session identifier in response to a determination by the proxy server that the proxy server is managing a session identifier that was previously associated with the client by the proxy server;

obtaining a new session identifier and associating the session identifier with the client using information that is managed by the proxy server in response to a determination by the proxy server that the proxy server is not managing a session identifier that was previously associated with the client by the proxy server;

determining the application server that is a target of the resource request;

modifying the resource request by the proxy server to include the session identifier or the new session identifier, wherein the resource request is modified according to a configuration uniquely associated with the application server that is the target of the resource request, wherein the step of modifying includes:

retrieving configuration information associated with the application server of the set of application servers, wherein the configuration information associated with the application server indicates a type of modification to be made to resource requests with respect to a session identifier; and formatting the modified resource request in accordance with the configuration information associated with the application server; and forwarding the modified resource request by the proxy server to the application server that is the target of the resource request.

12. The apparatus of claim 11 further comprising:

obtaining, in response to a determination by the proxy server that the proxy server is not managing a session identifier that was previously associated with the client by the proxy server, the new session identifier by using an SSL (Secure Sockets Layer) identifier as the new session identifier if the client has connected to the proxy server using SSL.

13. The apparatus of claim 11 wherein the method further comprises:

returning, in response to a determination by the proxy server that the proxy server is not managing a session identifier that was previously associated with the client by the proxy server, the new session identifier to the client as an HTTP (HyperText Transport Protocol) cookie if the resource request was an HTTP request.

14. The apparatus of claim 11 wherein the method further comprises:

generating at the proxy server a session identifier for each session between an application server and a client.

15. The apparatus of claim 11 wherein the method further comprises:

managing at the proxy server a session identifier for each session between an application server and a client.

* * * * *